Oct. 18, 1960     B. I. ULINSKI     2,956,631

TRAILER HITCH

Filed Dec. 3, 1957     3 Sheets-Sheet 1

INVENTOR.
BRONISLAUS I. ULINSKI
BY
A. H. Golden
ATTORNEY

Oct. 18, 1960  B. I. ULINSKI  2,956,631
TRAILER HITCH
Filed Dec. 3, 1957  3 Sheets-Sheet 2
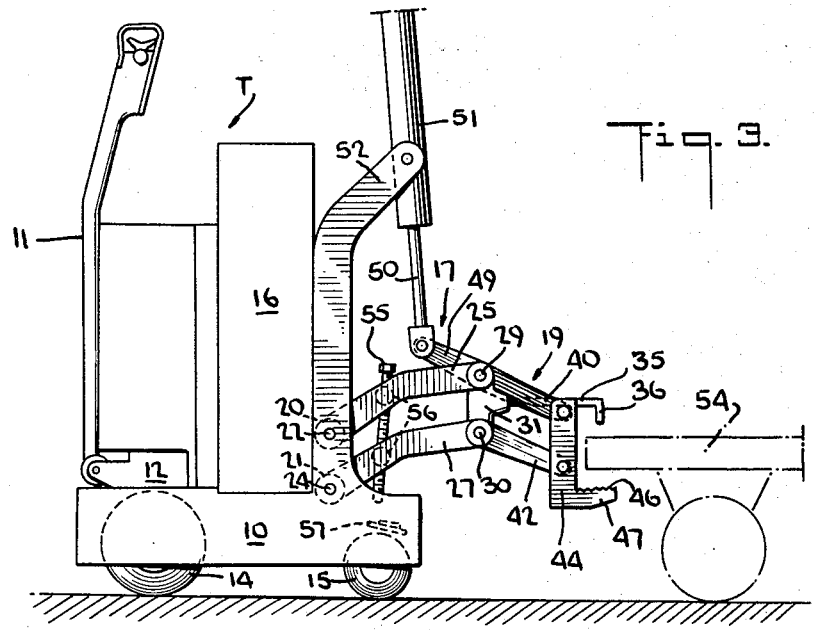
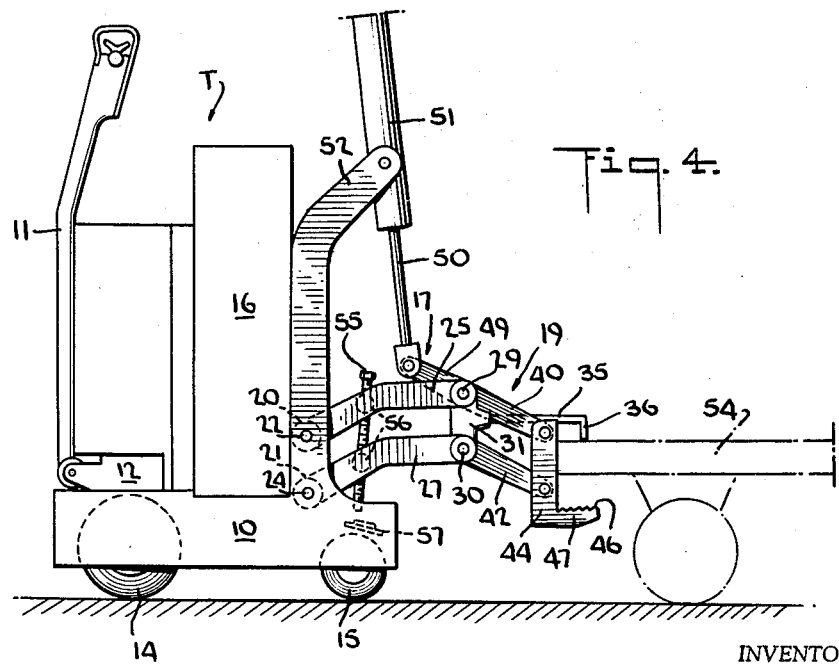
INVENTOR.
BRONISLAUS I. ULINSKI
BY
A.H. Golden
ATTORNEY Oct. 18, 1960

B. I. ULINSKI 2,956,631

TRAILER HITCH

Filed Dec. 3, 1957

INVENTOR.
BRONISLAUS I. ULINSKI

BY

ATTORNEY

United States Patent Office
2,956,631
Patented Oct. 18, 1960

2,956,631

TRAILER HITCH

Bronislaus I. Ulinski, Flossmoor, Ill., assignor to The Yale and Towne Manufacturing Company, Stamford, Conn., a corporation of Connecticut Filed Dec. 3, 1957, Ser. No. 700,359

9 Claims. (Cl. 180—13)

This invention relates to industrial trucks, and, more particularly, to a trailer hitch mechanism adapted for use in an industrial truck.

The use of a trailer hitch in an industrial truck presents several very considerable problems. Among these is the difficulty of steering an integrated unit after the truck and trailer are effectively hitched. This particular difficulty is attributable to the number of non-steerable, ground engaging wheels in the unit, some of which tend to rub laterally against the ground surface when the truck is turning. Accordingly, I have conceived by my invention a novel trailer hitch construction whereby, after effectively gripping the trailer, I am able to lift a portion of the truck to bring some of its wheels out of contact with the ground surface so that the truck may more efficiently manipulate the trailer.

As a basic feature of the present invention, I arrange a hydraulic ram on a truck so that this same ram first effects clamping of the hitch to a trailer, and then lifts the front wheels of the truck out of contact with the ground surface to facilitate steering with the rear wheel or wheels of the truck, as the case may be. In this connection, an important part of my contribution resides in the provision of suitable means to limit the extent to which the front wheels of the truck will be lifted off the ground, and also, to thereafter enable additional thrust to be built up in the ram to assure effective clamping of the trailer.

Among additional problems presented by the use of a trailer hitch in an industrial truck is the fact that trailers are constructed with various physical characteristics so that the trailer hitch, to be universal in operation, must be able to engage various types of trailers, and at different levels. Heretofore, this required flexibility has been provided by constructions requiring time-consuming manual adjustment to compensate for various trailer heights and construction.

Therefore, it is an additional feature of my invention to provide my novel trailer hitch construction with a simplified linkage arrangement that automatically clamps or grips the ends of trailers regardless of the height level of the trailer end and without the need for manual adjustment.

As another feature of the invention, I prefer that the linkage arrangement comprise a parallelogram leverage system pivoted to the truck frame for vertical swinging movement. The forward arms or links of this system are vertical and are arranged to maintain their angular relation relatively to the truck in all positions of elevation. The linkage arrangement also includes a second parallelogram leverage system extending forwardly of the first system and pivoted to the forward arms or links of the first system, whereby those arms constitute a part of both systems. Preferably, jaw members carried by the linkage arrangement and operable to clamp or grip the ends of trailers may be manipulated into any desired trailer clamping position.

As a further feature of the present invention, I provide an upper jaw pad fixed to the forward arm of the first leverage system and a pair of lower jaw pads carried by the second leverage system in opposed relation to the upper jaw pad for clamping a trailer end between the upper and lower jaw pads.

As an additional feature of the invention, the linkage arrangement includes a lever that constitutes, in effect, a part of the second leverage system extending rearwardly of that system. The rear end of the lever is connected to the piston rod of the ram that is mounted on the frame of the truck. The ram swings the entire linkage arrangement vertically relatively to the frame of the truck, and also brings the jaw pads into clamping arrangement with the end of a trailer to be moved.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

An illustrated embodiment of the invention has been chosen for purposes of illustration and description, and is shown in the accompanying drawing forming a part of the specification.

In the drawing:

Fig. 3 is a side elevational view of a truck and hitch made in accordance with the present invention in one position relatively to a trailer;

Fig. 4 is a view similar to Fig. 3 but showing the hitch in a second position prior to clamping the trailer end;

Figure 1:
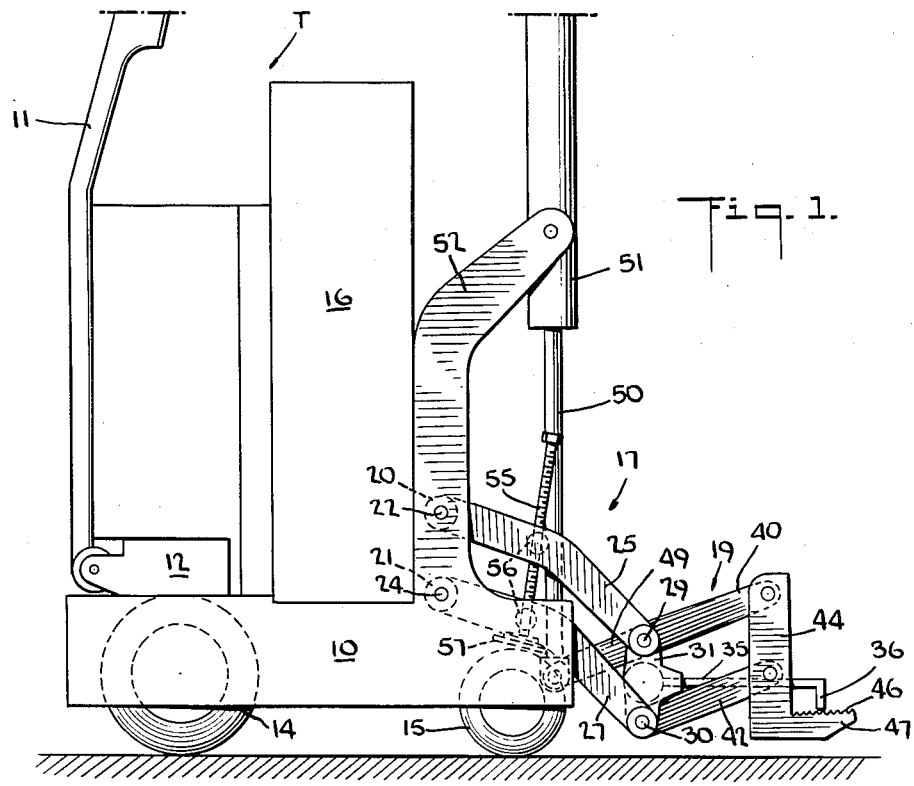
Fig. 1 is a side elevational view of an industrial truck equipped with a trailer hitch of the type contemplated by the present invention.
Figure 2:
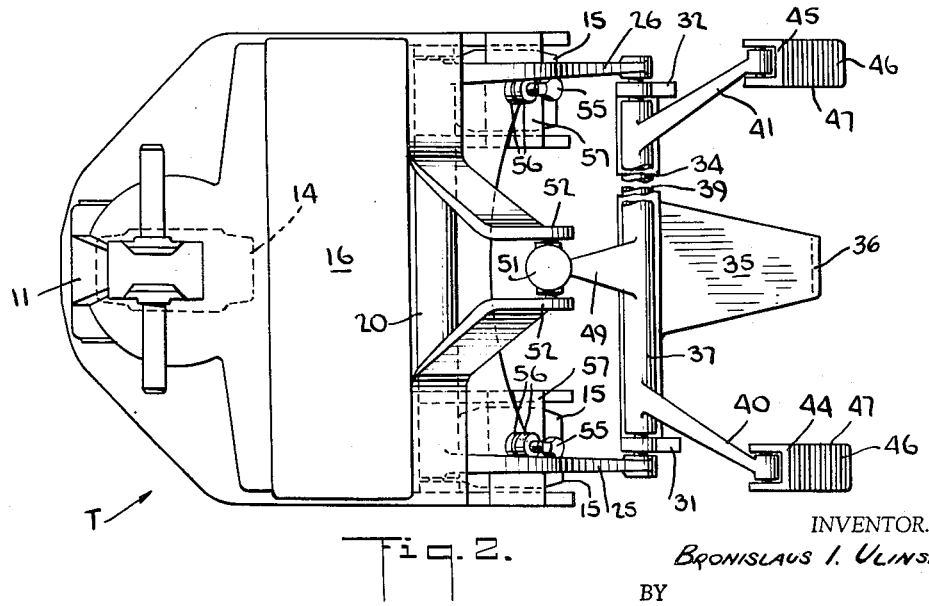
Fig. 2 is a top plan view of the truck illustrated in Fig. 1.

Referring to the drawings, and particularly to Figs. 1 and 2 thereof, it will be seen that I have chosen to illustrate my trailer hitch mounted on a motorized hand truck T having a main frame 10, a steering and control handle 11 connected to a drive unit 12 mounted on the frame, a front steering and traction wheel 14, a pair of rear wheels 15 and a battery compartment 16 supported on the frame.

As I have mentioned heretofore, the jaw members of my present invention are carried by a linkage arrangement pivoted on the truck frame and comprising a first parallelogram leverage system 17 and a second parallelogram leverage system 19.

The first parallelogram leverage system 17 comprises upper and lower sleeve members 20 and 21 transversely mounted on the frame by vertically spaced pivots 22 and 24, respectively. The upper sleeve member 20 is formed with a pair of arms 25 and 26 extending forwardly of the truck from the ends of the sleeve member. Similarly, the lower sleeve member 21 has a pair of arms (only one of which is shown as at 27) also extending forwardly of the truck and in parallelism with the upper arms 25 and 26, respectively.

Both the upper and the lower pairs of arms are connected at their forward ends by transverse pivot pins 29 and 30, respectively, and these pins are maintained in the same vertically spaced relation as the pivots 22 and 24 by vertical arms or links 31 and 32 connecting the pins adjacent their ends. In order to complete this first parallelogram leverage system 17 the links 31 and 32 (Fig. 2) are centrally connected by a transverse bar 34 which may be integrally formed with the links themselves to provide a unitary link member.

A central zone of the bar 34 serves as an anchor for a forwardly extending plate 35 having converging side edges and a jaw pad 36 in the form of a downturned flange at its forward end.

I have stated that the linkage arrangement of the present invention includes a second parallelogram leverage system 19 extending forwardly of the first system. This second system includes upper and lower sleeves 37 and 39 (Fig. 2) journalled on the pivot pins 29 and 30, respectively, and extending transversely between the vertical links 31 and 32. The upper sleeve is formed with a pair of diverging arms 40 and 41, best shown in Fig. 2, and the lower sleeve 39 is similarly formed with a pair of diverging arms (only one of which is shown as at 42) in vertical parallelism with the upper arms 40 and 41, respectively. This parallel relation of these arms is maintained by pivotally connecting the forward ends of each vertically spaced set of arms to vertical links 44 and 45, at points spaced the same distance apart as the pivot pins 29 and 30, thereby completing the second parallelogram leverage system 19.

The vertical links 44 and 45 of the second system are L-shaped in profile and the upper surfaces 46 of the horizontal legs 47 of these links are scored to provide improved gripping characteristics so that the legs 47 constitute the lower jaw pads of my invention. In this connection it will be noted that the arms of the second leverage system 19 and the forwardly extending plate 35 are so dimensioned that a transverse vertical plane passing through the jaw pad 36 will intersect the legs or jaw pads 47 wherefore these members are disposed in vertical clamping relation. The jaw pad 36 may, of course, be structurally similar to the legs 47 but supported in opposed relation to those legs.

From the description thus far, it will be seen that the first leverage system 17, and the jaw pad 36, may be swung vertically about the pivots 22 and 24, while carrying the second leverage system 19, and the jaw pads 47. Additionally, it will be seen that the second leverage system 19, and the jaw pads 47 may be swung vertically about the pivot pins 29 and 30, the links 31 and 32 constituting part of both leverage systems 17 and 19.

For the purposes of achieving vertical swinging movement of both leverage systems, I provide a rearwardly extending lever 49 integral with upper sleeve member 37, as best seen in Fig. 2. Because of this relationship, lever 49 is integral with arms 40, 41. The rear end of this lever 49 is pivotally connected to the end of a piston rod 50 of a hydraulic ram 51. The cylinder of this ram 51 is pivoted between the ends of a pair of parallel upstanding beams 52 constituting part of the main frame 10.

For a purpose to appear presently, I provide a pair of threaded studs or bolts 55 mounted in threaded brackets 56 secured to the inner surfaces of each of the forwardly extending arms of the first leverage system 17. There is further provided a strike plate 57 integral with each side of main frame 10 and having a surface extending laterally to be positioned directly beneath the lower end of each stud 55. Depending upon the level of that portion of the trailer to be gripped, the studs 55 are preset in their brackets 56.

The operation of my novel trailer hitch is best illustrated in Figs. 3 to 6 in which a portion of a trailer 54 is shown in broken lines.

As shown in Fig. 3, the piston rod 50 of the ram 51 is first positioned to hold the leverage systems 17 and 19 so that opposed trailer gripping jaws 36 and 46 will be approximately in the zone of the trailer part to be gripped. The truck is then propelled towards the trailer 54 until the end of the trailer is positioned between the jaw pads 36 and 47.

Figure 5:
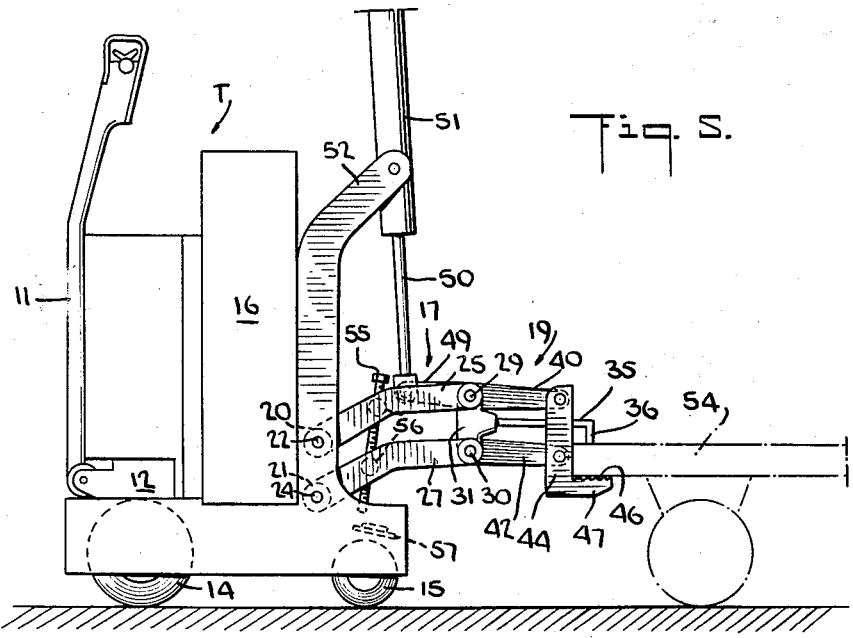
Fig. 5 is a view similar to Fig. 4, but showing the hitch in clamping relation with the trailer end.

The piston rod 50 is then extended causing the linkage system 17 and 19 to start to swing downwardly about the pivots 22 and 24 until the jaw pad 36 abuts the upper surface of the trailer 54 as shown in Fig. 4, thereby preventing further downward movement of the first leverage system 17. Continued extension of the piston rod pivots the second leverage system 19 upwardly about the pivot pins 29 and 30, thereby raising the jaw pads or legs 47 until they abut the lower surface of the trailer 54, as seen in Fig. 5.

I have now described that portion of the operation of my novel trailer hitch necessary to integrate the truck and trailer into a single unit. I shall now proceed to describe the manner in which my construction may be further operated to enable the integrated unit to be efficiently steered and maneuvered.

Figure 6:
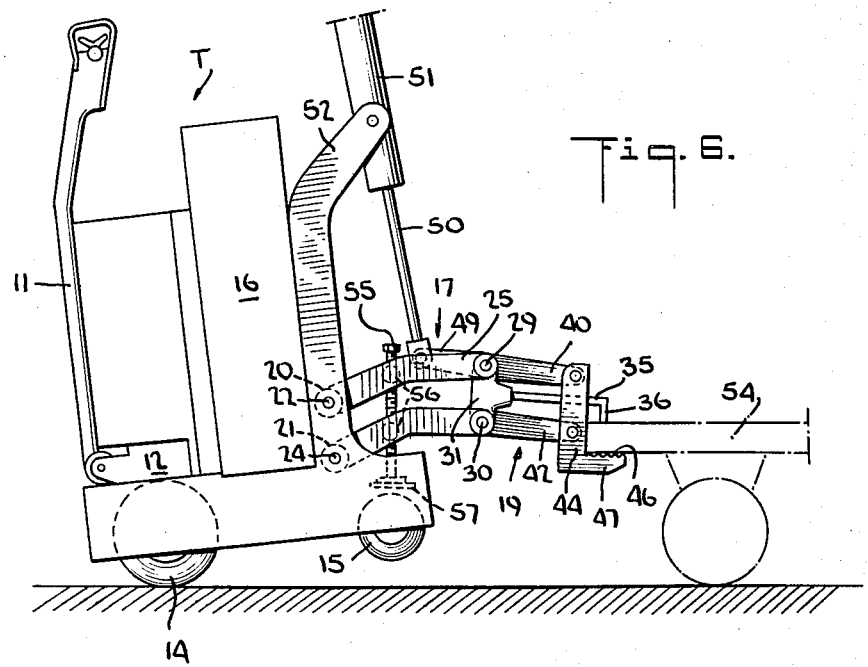
Fig. 6 is a view similar to Fig. 5 but showing the truck and hitch in final clamping position relatively to the trailer.

Having effected clamping or integral relation of the truck and trailer, the piston rod 50 is extended still further. Since the jaw pads 36 and 46 are in clamping engagement with the trailer 54, they can no longer be moved by extension of the ram. Therefore the pads transmit the ram thrust to the trailer so that the thrust reaction is accepted by the beams 52 causing the truck T to tilt bodily rearwardly about the axis of rotation of the rear wheel 14 thereby raising the front wheels 15 out of contact with the ground surface, as shown in Fig. 6. The bolts 55 having been preset, abut the plates 57 to limit tilting of the truck to the desired elevation. Furthermore, the bolts 55, in contact with the plates 57, act together with the beams 52 to accept additional thrust applied to the ram piston. This additional thrust increases the clamping force of the jaw pads establishing the trailer hitch firmly in clamping engagement with the trailer.

The operator may now operate the truck to transport the trailer to any desired location. Upon reaching the destination, the operator actuates the hydraulic ram 51 to retract the piston rod 50 thereby lowering the front wheels of the truck into contact with the ground surface as shown in Fig. 5. Further retraction of the piston rod raises the lever 49 relatively to the truck frame thereby pivoting the second leverage system 19 downwardly about the pivot pins 29 and 30 to lower the jaw pads 47 out of contact with the lower surface of the trailer 54 into the position illustrated in Fig. 4. The truck may now be driven away from the trailer and further retraction of the piston rod 50 swings both leverage systems 17 and 19 upwardly into the desired position for engagement with another trailer.

From the foregoing description, it will be seen that I have contributed a trailer hitch construction embodying a simplified linkage arrangement permitting automatic clamping or gripping of trailers regardless of the height level of the trailer end, and without the need for manual adjustment. It will also be seen that this same construction enables the front wheels of the truck to be lifted out of contact with the ground surface so that the truck may be readily steered to manipulate a trailer with great facility and efficiency.

I believe that the construction and operation of my novel trailer hitch will now be understood, and that the advantages of my invention will be fully appreciated by those persons skilled in the art.

I claim:

1. In a truck of the class described, a frame, a leverage system pivoted on said frame for vertical swinging movement, jaw pad means carried by said leverage system for movement with said system, a second leverage system mounted on said first leverage system for swinging movement relatively to said first system, second jaw pad means carried by said second leverage system in opposed relation to said first jaw pad means, and means mounted on said frame actuating said system for swinging said first system relatively to said frame and said second system relatively to said first system to move one of said jaw pad means in a clamping direction relatively to the other of said jaw pad means.

2. In a truck of the class described, a frame, a pair of arms pivoted at their rear ends to said frame at linearly spaced points for vertical swinging movement, jaw pad means pivoted to said arms at points similarly spaced as the rear ends of said arms for movement with said arms, a leverage system pivoted to said arms, second jaw pad means carried by said leverage system in opposed relation to said first jaw pad means, and means mounted on said frame actuating said system for swinging said arms relatively to said frame and said system to move one of said jaw pad means in a clamping direction relatively to the other of said jaw pad means.

3. In a truck of the class described, a frame, a parallelogram leverage system pivoted on said frame for vertical swinging movement, a jaw pad carried by said parallelogram leverage system for movement with said system, a second leverage system pivoted to said first system, a jaw pad carried by said second leverage system in opposed relation to said first jaw pad, and a ram mounted on said frame for swinging said parallelogram system relatively to said frame and to move said second jaw pad in a clamping direction relatively to said first jaw pad.

4. In a truck of the class described, a frame, a leverage system pivoted on said frame for vertical swinging movement, a jaw pad carried by said leverage system for movement with said system, a parallelogram leverage system pivoted on said first leverage system for swinging movement relatively to said first system, a jaw pad carried by said parallelogram leverage system in opposed relation to said first jaw pad, and means mounted on said frame actuating said systems for swinging said first system relatively to said frame and said parallelogram leverage system relatively to said first leverage system to move one of said jaw pads in a clamping direction relatively to the other of said jaw pads.

5. In a truck of the class described, a frame, a parallelogram leverage system pivoted to said frame for vertical swinging movement, a jaw pad carried by said system, a second parallelogram leverage system pivoted to said first system for vertical swinging movement, a second jaw pad carried by said second system in vertical opposed relation to said first jaw pad, and means on said frame for swinging said first system to position said jaw pads vertically relatively to said frame and to move one of said jaw pads vertically relatively to the other of said jaw pads when said other pad engages an object to be clamped between said pads.

6. In a truck of the class described, a frame, a parallelogram leverage system pivoted to said frame for vertical movement relatively to said frame and including a vertical arm, a jaw pad carried by said arm, a second parallelogram leverage system pivoted to said arm and supported by said arm in forwardly extending relation to said first system, a second jaw pad carried by said second system in opposed relation to said first jaw pad, and means carried by said frame and connected to a part of said second system for moving said arm vertically when said jaw pads are unobstructed and for moving one of said jaw pads in a clamping direction relatively to the other of said jaw pads when movement of said other pad is obstructed as by an object to be clamped between said pads.

7. In a truck of the class described having rear steering and traction means and ground engaging front wheels, a frame supported by said wheels, a forwardly extending parallelogram leverage system pivoted to said frame for vertical swinging movement and including a vertical arm, a second parallelogram leverage system pivoted to said arm and extending forwardly of said arm whereby said arm constitutes a part of both said leverage systems, a jaw pad fixed to said arm, a second jaw pad carried by said second leverage system in opposed vertical relation to said first pad, a lever fixed to said second leverage system and extending rearwardly of said arm, a ram mounted on said frame and connected to the rear end of said lever, movement of said ram in one direction swinging said arm and second leverage system relatively to said frame when movement of said jaw pads is unobstructed and pivoting said second system relatively to said arm to bring said second pad towards said first pad when movement of said first pad in the direction of said second pad is obstructed, and further movement of the ram in the same direction raising said front wheels out of contact with the ground surface.

8. In a truck of the class described, a main frame, wheels supporting said main frame, a pair of opposed trailer-gripping jaws including an upper jaw and a lower jaw, means mounting said upper jaw for vertical movement relatively to said main frame, means mounting said lower jaw on said upper jaw for vertical movement with said upper jaw and for movement relatively towards said upper jaw to clamp a portion of a trailer between said jaws, jaw actuating means connected to said lower jaw for moving said lower jaw towards said upper jaw in response to a force applied to said jaw actuating means in a downward direction, and power means interconnecting said frame and said jaw actuating means for applying a downwardly directed force between said frame and said jaw actuating means to first move said jaws into gripping relation with a portion of a trailer and thereafter tilt said frame bodily about certain of said wheels to lift other of said wheels out of contact with the ground.

9. In a truck of the class described, a main frame, wheels supporting said main frame, a pair of opposed trailer-gripping jaws including an upper jaw and a lower jaw, means mounting said upper jaw for vertical movement relatively to said main frame, means mounting said lower jaw on said upper jaw for vertical movement with said upper jaw and for movement relatively towards said upper jaw to clamp a portion of a trailer between said jaws, jaw actuating means connected to said lower jaw for moving said lower jaw towards said upper jaw in response to a force applied to said jaw actuating means in a downward direction, and a ram connected at one end to said frame and connected at the other end to said jaw actuating means for applying a downwardly directed force between said frame and said jaw actuating means to first move said jaws into gripping relation with a portion of a trailer and thereafter tilt said frame bodily about certain of said wheels to lift other of said wheels out of contact with the ground.

References Cited in the file of this patent

UNITED STATES PATENTS

| | | |
|---|---|---|
| 722,262 | Stone | Mar. 10, 1903 |
| 2,529,159 | Hyler | Nov. 7, 1950 |
| 2,669,314 | Quayle | Feb. 16, 1954 |
| 2,878,884 | Schreck | Mar. 24, 1959 |

FOREIGN PATENTS

| | | |
|---|---|---|
| 144,506 | Australia | Dec. 28, 1951 |